April 28, 1936.  J. EDGAR  2,038,554
SPLINE COUPLING
Filed July 1, 1932  3 Sheets-Sheet 1
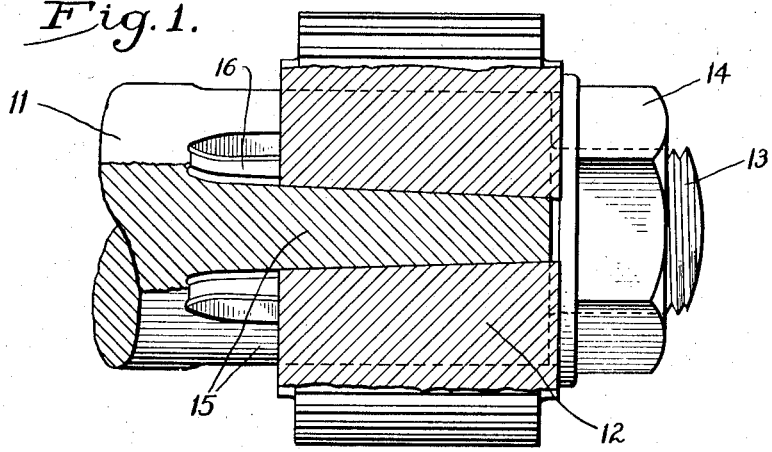
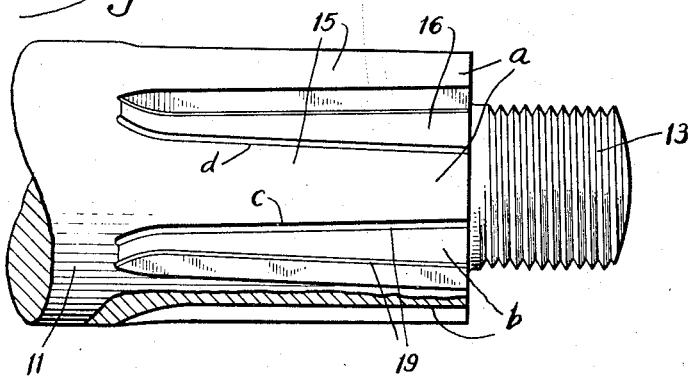
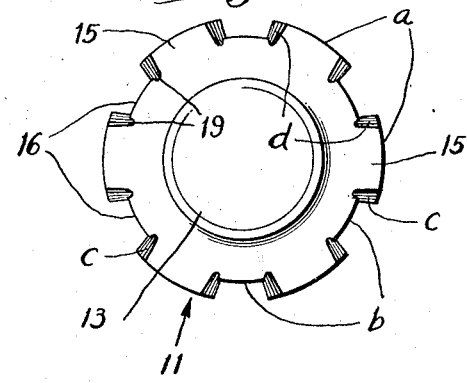
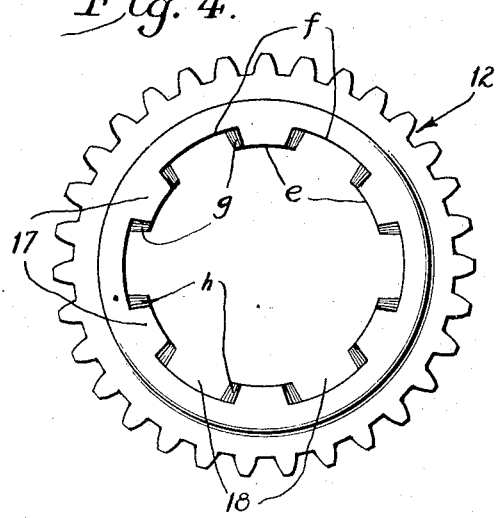
INVENTOR
John Edgar
BY Chindahl, Parker & Carlson
ATTORNEYS

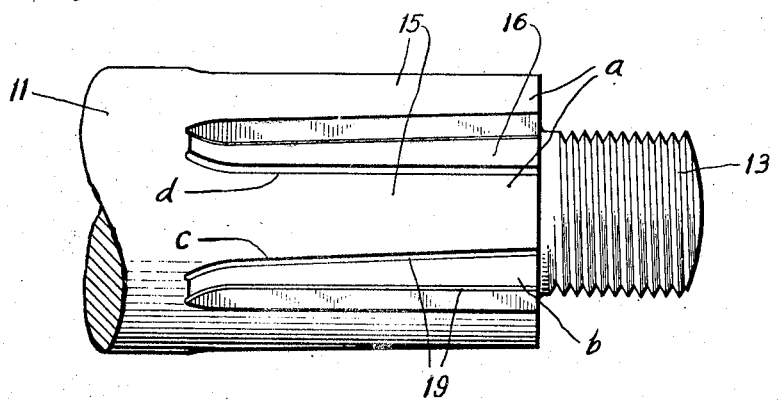
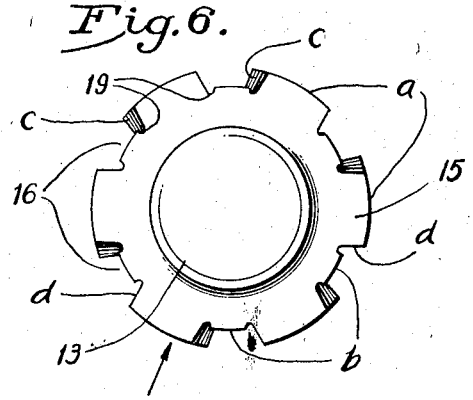
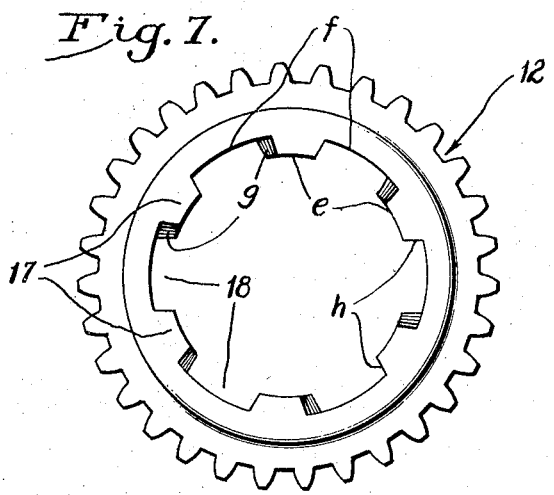

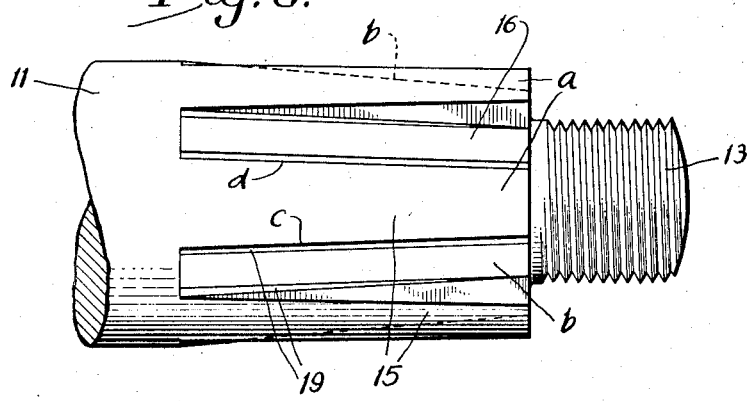
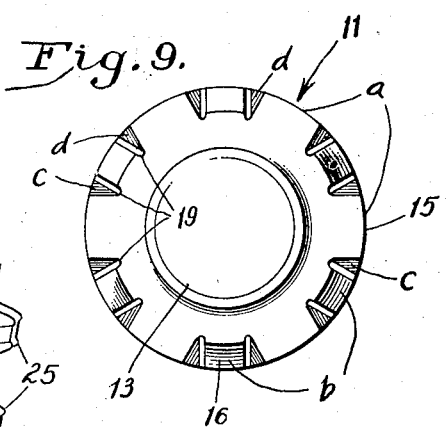
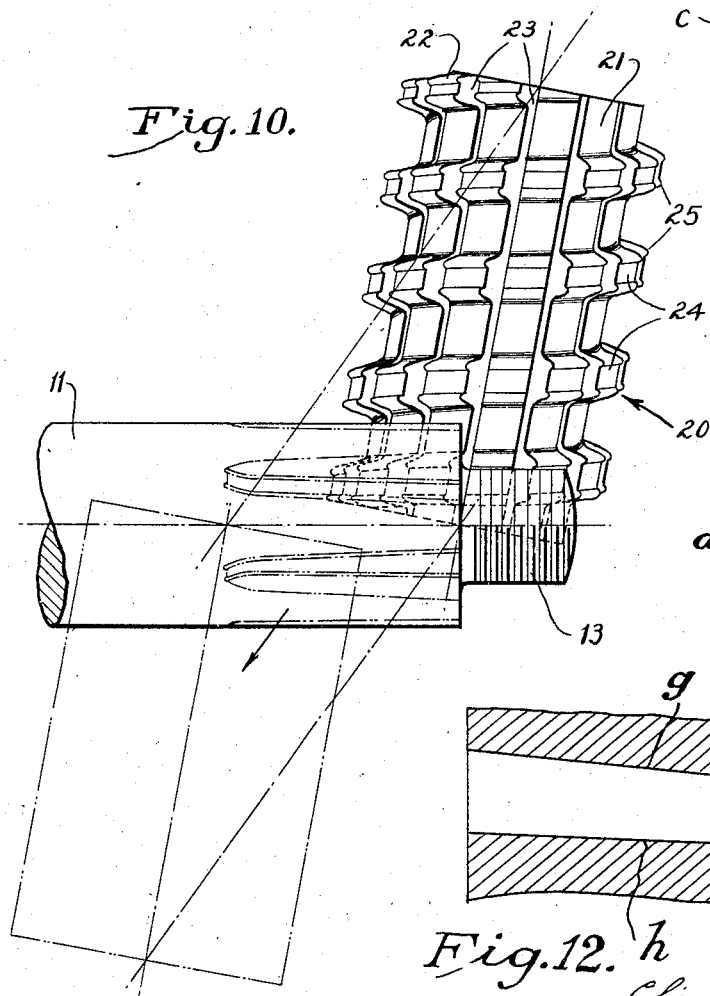
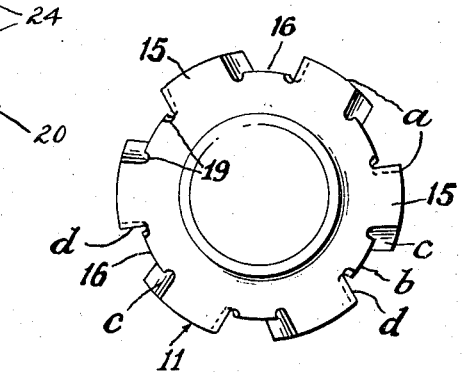
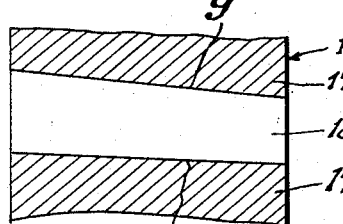
INVENTOR
John Edgar
BY Chindahl, Parker & Carlson
ATTORNEYS Patented Apr. 28, 1936

2,038,554

UNITED STATES PATENT OFFICE 2,038,554

SPLINE COUPLING

John Edgar, Rockford, Ill., assignor to Barber-Colman Company, Rockford, Ill., a corporation of Illinois Application July 1, 1932, Serial No. 620,449

13 Claims. (Cl. 287—53)

The present invention relates to a new form of spline coupling for securing an outside member, such as the hub of a gear, to an inside member, such as a shaft.

The primary objects of the present invention reside in the provision of a novel spline coupling which affords a strong, secure and tight connection, which is adjustable to take up whatever looseness, if any, that may develop in use, which will fit accurately in any position of adjustment, and which is adapted to be made accurately and economically at a high rate of production.

A further object is to provide a new and improved generated shaft or inside member having generally longitudinal integral keys tapered in width, with at least one side of each key helicoidal in form.

Still another object resides in various novel features of the outside member.

Further objects and advantages will become apparent as the description proceeds.

In the accompanying drawings:

Figure 1 is a fragmentary view of a coupling assembly embodying the features of my invention, and sectioned longitudinally in a plane intersecting the sides of one key approximately at the pitch line.

Fig. 2 is a side elevational view of the inside member.

Fig. 3 is an end elevational view of the inside member.

Fig. 4 is an end elevational view of the outside member.

Fig. 5 is a view similar to Fig. 2 but of a modified form of inside member.

Fig. 6 is an end elevational view of the inside member shown in Fig. 5.

Fig. 7 is a view similar to Fig. 4 but of an outside member adapted to interfit with the inside member of Fig. 5.

Fig. 8 is a side elevational view of another modified form of inside member.

Fig. 9 is an end elevational view of the inside member shown in Fig. 8.

Fig. 10 is a diagrammatic view illustrating a hobbing method for forming the inside member.

Fig. 11 is an end elevational view of the inside member of another modified form of coupling.

Fig. 12 is a diagrammatic sectional view of one of the keyways of the outside member adapted to interfit with the inside member of Fig. 11.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the spline coupling constituting the exemplary embodiment of the invention comprises an inside member 11 and an outside member 12 adapted to be rigidly secured thereon. In the present instance, the inside member 11 is shown as one end of a shaft, and the outside member 12 is illustrated as the hub of a gear. The end of the shaft 11 is formed with a reduced threaded extension or stud 13 adapted to receive a suitable nut 14.

Formed integrally with the end of the shaft 11 are a plurality of generally longitudinal splines or spline keys 15 separated by interdental spaces 16. The keys 15 are alike in form and preferably located in uniformly spaced relation about the shaft 11, and, as viewed from the free end of the inside member, comprise tops or outer faces $a$, bases $b$ and left and right sides $c$ and $d$.

In the present instance, the tops $a$ of the keys 15 are cylindrical segments of uniform radius and concentric to the axis of the shaft 11 throughout their length, and preferably are coincident with the cylindrical projection of the shaft.

It will be evident that the bases $b$ of the keys 15 constitute the roots of the interdental spaces 16. The roots $b$ in any transverse plane are arcuate in form and segments of a circle concentric to the axis of the shaft 11. In the two forms of inside members illustrated in Figs. 2 and 5, the roots $b$ are parallel to the axis of the shaft 11, and hence define a cylindrical base for the keys 15. Consequently, the keys 15 are uniform in height throughout their effective length. However, in the modified form of Figs. 8 and 9, the roots $b$ are uniformly and similarly inclined toward the axis of the shaft 11 to define a symmetrically tapered or conical base for the keys 15. In this instance, the keys 15 are tapered gradually and uniformly in height along their length.

The keys 15 are uniformly tapered in width along their length so that the sides $c$ and $d$ of each key diverge and of each space 16 converge inwardly from the free end of the shaft 11. As a result, the outside member 12 seats on the sides of the keys 15 and is accurately centered thereby. In the form of Figs. 8 and 9, the outside member 12 also seats on the roots $b$.

The keys 15 may be tapered in various ways. Thus, the sides $c$ and $d$ may be inclined in opposite directions with leads of equal degree as illustrated in Figs. 2 and 3. Keys of this form are symmetrical with respect to a medial axial plane. However, in Figs. 5 and 6, only one side of each key 15, namely the side $c$, is inclined longitudinally, whereas the other side, namely the side $d$, is parallel to the axis of rotation and plane in form. It would also be possible to incline the sides $c$ and $d$ in opposite directions with leads of unequal degrees, or in the same direction relative to the axis of rotation with leads of unequal degrees. Fig. 11 illustrates an inside member 11 in which the sides $c$ and $d$ of the keys 15 are helically inclined in the same direction with leads of unequal degree. One of the complemental keyways 18 of the coacting outside member 12, having sides $g$ and $h$ adapted for surface contact with the sides $c$ and $d$, is illustrated in Fig. 12.

One of the primary features of the invention resides in providing sides $c$ and $d$ having a generatrix bearing a constant angular relation to the radial throughout the length of the keys 15, so that, with a straight line generatrix, where a side is parallel to the axis it will define a plane surface, and where a side has a lead other than zero it will define a helicoidal surface.

The hub or outside member 12 is complemental in form to the mating inside member 11. Thus, the outside member 12 has a plurality of generally longitudinal inwardly extending keys or projections or splines 17 separated by interdental keyways 18.

The keys or projections 17 conform in number spacing and shape to the spaces 16 and the keyways 18 conform similarly to the keys 15. Thus, the projections 17 have inner faces $e$ laterally arcuate in form, bases $f$ which constitute the roots of the keyways 18, and sides $g$ and $h$ adapted to seat respectively on the sides $c$ and $d$. The roots $f$ define segments of a cylindrical contour adapted to receive the shaft 11 with the keys 15 interfitting with the projections 17. Preferably, this contour is slightly greater in diameter than that of the shaft 11 so as to provide clearance between the keys 15 and the roots $f$ of the keyways 18.

In Figs. 4 and 7, the inner faces $e$ define segments of a cylindrical contour concentric with but preferably slightly greater in diameter than that of the roots $b$ so as to provide a slight clearance between the projections 17 and the roots of the spaces 16. Hence, in these forms, metal to metal contact is provided only between the mating faces $c$ and $d$ and $g$ and $h$. In the outside member for the shaft shown in Figs. 8 and 9 (not shown), the inner faces $e$ would be formed to define segments of a conical bore so as to seat on the roots $b$.

The sides $g$ and $h$ of the outside member in Fig. 4 are helicoidal and have the same leads as the sides $c$ and $d$ of the form of shaft illustrated in Figs. 1 to 3. The outside member for the shaft shown in Figs. 8 and 9 would have similar sides. In the outside member of Fig. 7, the side $g$ is helicoidal in form and the side $h$ is flat and parallel to the axis to interfit respectively with the sides $c$ and $d$ of the shaft 11 illustrated in Figs. 5 and 6.

The helicoidal form of the interfitting sides $c$, $d$, $g$ and $h$ having a lead is important. If these sides were flat, they would interfit accurately only in one relative axial position of the inside and outside members, and hence would not be self-compensating in the event of wear and would require very close manufacturing tolerances. However, by reason of their helicoidal form, the inclined mating sides are accurately complementary to each other, and will interfit closely to provide a good bearing along their entire length upon being brought into engagement, regardless of the relative axial position of the inside and outside members.

In addition to the foregoing structural advantages, there are also various important manufacturing virtues inherent in the helicoidal form of the inclined sides of the keys 15 and the projections 17. Thus, to be commercially practicable, the coupling must lend itself to relatively inexpensive methods of production. In this connection, the helicoidal form permits of the use of high speed methods of production, such for example as hobbing of the inside member 11, and forming of the outside member 12 by means of a multiple broach. These two methods lend themselves particularly well to mass production of interchangeable parts such as are here involved. In forming the outside member, an inside bore, either conical or cylindrical, defining the inner faces $e$, first is formed. Then, a multiple broach is pulled through the bore twice to form the opposite sides of the projections 17 and incidentally the recesses 18. In each broaching operation, the broach acts simultaneously on all of the projections, and forms one side thereof. For the sides of helicoidal form, a multiple helical broach is employed. The methods of producing the inside and outside members 11 and 12 form the subject matter of my copending applications Serial No. 625,290, filed July 28, 1932 and Serial No. 52,061, filed November 29, 1935, respectively.

In use, the hub 12 is fitted onto the splined end of the shaft 11 with the sides of the projections 17 in engagement with the sides of the keys 15, and is tightly secured in position by means of the nut 14. Since contact is identical on all of the keys 15, the hub will be accurately centered. It will be evident that looseness between the shaft 11 and the hub 12 can be fully taken up regardless of wear without losing the full length contact characteristic of the helicoidal surfaces, and that a tight connection, held definitely against relative rotation is obtained.

Another feature of the invention resides in generating the specific form of inside member 11 herein disclosed. In the present instance, the keys 15 are produced by a hobbing method which makes possible the formation of the keys integral with the shaft 11 without encountering interference even though the roots of the spaces 16 vary in width, and also the correct form of the helicoidal sides $c$ and $d$ and the roots $b$. Generated keys are accurately spaced and correctly formed in all detail.

Preferably, clearance slots 19 are formed in the spaces 16 at the longitudinal margins of the roots $b$ to depress the curved junctures, resulting from the hobbing method, between the sides $c$ and $d$ of the keys 15 and the roots $b$ so that the sharp edges of the projections 17 will not come into interference therewith.

In carrying out the hobbing method, a special hob 20 is used. The hob has a cylindrical body 21, and preferably has a single thread 22 intersected by inclined generally longitudinal gashes 23 to form teeth 24. The hob thread 22 is tapered in width at the pitch line from one end to the other. The form and lead of opposite sides of the thread 22 correspond to the physical characteristics of the keys 15 and are varied for different forms of inside members 11. Ribs or projections 25 are formed on the hob teeth to cut the clearance slots 19.

One suitable method adapted for the inside member 11 of Fig. 2 is illustrated in Fig. 10. In this instance, the hob 20 has a thread 22 of uniform height and with opposite sides generated on different pitch circles to provide same respectively with short and long leads of equal degree relative to the thread helix corresponding to the leads of the sides c and d. The hob 20 is inclined to bring the thread 22 into parallel relation to the keys 15 to be cut and is located initially off the end and at one side of the shaft 11 as shown in full outline. In operation, the hob 20 and the shaft 11 are rotated in timed relation, and the hob is fed relatively across the shaft through cutting engagement therewith in a diagonal direction along the arrow into the position indicated in dotted outline. The longitudinal contour of the hob 20 as projected along the path of movement onto the axial plane of the shaft coincides with the form to be cut.

While I have specifically disclosed two high speed methods for producing the inside and outside members respectively, it is to be understood that any suitable high speed methods for forming or generating these members and rendered available by reason of the helicoidal form of the sides of the keys or projections may be employed.

I claim as my invention:

1. As an element of a coupling, wherein an inner shaft member and an outer encircling member are peripherally connected by interengaging spline keys in which the keys on the shaft member are adapted to be cut by high speed methods resulting in the provision of a shaft end, the shaft end which has a plurality of integral generally longitudinal spline keys separated by interdental spaces, the keys being peripherally spaced and being uniformly tapered in width along their length, one side of each key being helicoidal in form and having a lead in one direction relative to the axis of the shaft end.

2. As an element of a coupling, wherein an inner shaft member and an outer encircling member are peripherally connected by interengaging spline keys in which the keys on the shaft member are adapted to be cut by high speed methods resulting in the provision of a shaft end, the shaft end which has a plurality of integral generally longitudinal spline keys separated by interdental spaces, the keys being peripherally spaced and being uniformly tapered in width along their length, the sides of each key having leads in opposite directions relative to the axis of the shaft end and being helicoidal in form.

3. As an element of a coupling, wherein an inner shaft member and an outer encircling member are peripherally connected by interengaging spline keys in which the keys on the shaft member are adapted to be cut by high speed methods resulting in the provision of a shaft end, the shaft end which has a plurality of integral generally longitudinal spline keys separated by interdental spaces, the keys being peripherally spaced and being uniformly tapered in width along their length, one side of each key being helicoidal in form and having a lead in one direction relative to the axis of the shaft end, and the other side of each key being plane and parallel to the said axis.

4. As an element of a coupling, wherein an inner shaft member and an outer encircling member are peripherally connected by interengaging spline keys in which the keys on the shaft member are adapted to be cut by high speed methods resulting in the provision of a shaft end, the shaft end which has a plurality of integral generally longitudinal generated spline keys separated by interdental spaces, the roots of the spaces being spaced segments of a cone concentric to the axis of the shaft end, the keys being peripherally spaced and being uniformly tapered in width along their length, the sides of each key having leads in opposite directions relative to the axis of the shaft end and being helicoidal in form.

5. As an element of a coupling, wherein an inner shaft member and an outer encircling member are peripherally connected by interengaging spline keys in which the keys on the shaft member are adapted to be cut by high speed methods resulting in the provision of a shaft end, the shaft end which has a plurality of integral generally longitudinal generated spline keys separated by interdental spaces, the keys being uniformly peripherally spaced and being uniformly and symmetrically tapered in width and uniform in height along their length, the outer peripheral faces of the keys being spaced segments of an outer cylindrical contour, the sides of each key having leads of equal degree in opposite directions and being helicoidal in form with straight line generatrixes.

6. As an element of a coupling, wherein an inner shaft member and an outer concentric encircling member are peripherally connected by spline keys having complemental sides in interfitting engagement, and wherein the keys are adapted to be cut by high speed methods, the outer encircling member which comprises a plurality of generally longitudinal inwardly projecting spline keys separated by interdental keyways adapted to receive the keys on the shaft member, said inwardly projecting keys being peripherally spaced and being uniformly tapered in width along their length, one side of each of said inwardly projecting keys being helicoidal in form and having a lead in one direction relative to the axis of said encircling member.

7. As an element of a coupling, wherein an inner shaft member and an outer concentric encircling member are peripherally connected by spline keys having complemental sides in interfitting engagement, and wherein the keys are adapted to be cut by high speed methods, the outer encircling member which comprises a plurality of generally longitudinal inwardly projecting spline keys separated by interdental keyways adapted to receive the keys on the shaft member, said inwardly projecting keys being peripherally spaced and being uniformly tapered in width along their length, the sides of each of said inwardly projecting keys being helicoidal in form and having leads in opposite directions relative to the axis of said encircling member.

8. As an element of a coupling, wherein an inner shaft member and an outer concentric encircling member are peripherally connected by spline keys having complemental sides in interfitting engagement, and wherein the keys are adapted to be cut by high speed methods, the outer encircling member which comprises a plurality of generally longitudinal inwardly projecting spline keys separated by interdental keyways adapted to receive the keys on the shaft member, said inwardly projecting keys being peripherally spaced and being uniformly tapered in width along their length, one side of each of said inwardly projecting keys being helicoidal in form and having a lead in one direction relative to the axis of said encircling member, and the other side of each key being plane and parallel to said axis.

9. A spline coupling comprising, in combination, an inner shaft member having a plurality of generally longitudinal spline keys separated by interdental spaces and adapted to be cut by high speed methods, the keys being peripherally spaced and being uniformly tapered in width along their length, with one side of each key being helicoidal in form and having a lead in one direction relative to the axis of the member, and an outer encircling concentric member having inwardly projecting keys complemental to the keys of the shaft member and adapted for axial wedging interengagement therewith at the sides of the keys to lock the members against relative angular movement.

10. As an element of a coupling, wherein an inner shaft member and an outer encircling member are peripherally connected by interengaging spline keys in which the keys on the shaft member are adapted to be cut by high speed methods resulting in the provision of a shaft end, the shaft end which has a plurality of integral generally longitudinal spline keys separated by interdental spaces, the keys being peripherally spaced and being uniformly tapered in width along their length, one side of each key being helicoidal in form and having a lead in one direction relative to the axis of the shaft end, the other side of each key being helicoidal in form and having a lead different in degree relative to said axis than said first mentioned lead.

11. As an element of a coupling, wherein an inner shaft member and an outer encircling member are peripherally connected by interengaging spline keys in which the keys on the shaft member are adapted to be cut by high speed methods resulting in the provision of a shaft end, the shaft end which has a plurality of integral generally longitudinal spline keys separated by interdental spaces, the keys being peripherally spaced and being uniformly tapered in width along their length, the sides of each key respectively having leads of unequal degree in the same direction relative to the axis of the shaft end and being helicoidal in form.

12. An element of a coupling, wherein an inner shaft member and an outer concentric encircling member are peripherally connected by spline keys having complemental sides in interfitting engagement, and wherein the keys are adapted to be cut by high speed methods, the outer encircling member which comprises a plurality of generally longitudinal inwardly projecting spline keys separated by interdental keyways adapted to receive the keys on the shaft member, said inwardly projecting keys being peripherally spaced and being uniformly tapered in width along their length, the sides of each of said inwardly projecting keys being helicoidal in form and respectively having leads of unequal degree in the same direction relative to the axis of said encircling member.

13. A spline coupling comprising, in combination, an inside member having a substantially constant root diameter and having splines each with right hand and left hand helices on opposite sides respectively, and an outer encircling member having inwardly projecting splines complemental to said first mentioned splines and adapted for axial wedge surface interengagement therewith at the sides to lock said members against relative angular movement.

JOHN EDGAR.